United States Patent [19]
Martin et al.

[11] Patent Number: 5,834,031
[45] Date of Patent: Nov. 10, 1998

[54] APPARATUS AND METHODS FOR TREATING FOOT FUNGI

[75] Inventors: Frank G. Martin; Elizabeth C. Hamil, both of San Luis Obispo, Calif.

[73] Assignee: Del Industries, Inc., San Luis Obispo, Calif.

[21] Appl. No.: 734,238

[22] Filed: Oct. 21, 1996

[51] Int. Cl.⁶ ............... A61K 33/00; A61M 35/00; B01J 19/00
[52] U.S. Cl. ............. 424/613; 604/293; 422/186.07; 422/186.08; 422/186.12; 422/28; 128/897; 514/858
[58] Field of Search ............ 424/613; 514/858; 220/914; 422/28, 186.07, 186.08, 186.12; 604/293; 4/222; 128/897; 210/760

[56] References Cited

U.S. PATENT DOCUMENTS

| | | | |
|---|---|---|---|
| 3,198,726 | 8/1965 | Trikilis | 422/186.18 |
| 4,869,881 | 9/1989 | Collins | 422/186.18 |
| 4,966,717 | 10/1990 | Kern | 210/760 |
| 4,995,123 | 2/1991 | Kern | 4/490 |
| 5,098,415 | 3/1992 | Levin | 604/293 |

FOREIGN PATENT DOCUMENTS 7-196521  8/1995  Japan .

OTHER PUBLICATIONS

WPAT Abstract, accession No. 95–299501/39, 1995.
JAPIO Abstract, accession No. 95–196521, 1995.

*Primary Examiner*—John Pak
*Attorney, Agent, or Firm*—Frank J. Uxa

[57] ABSTRACT

Apparatus and methods for treating feet infected with fungi are disclosed. In one embodiment, such an apparatus includes a container adapted to hold a quantity of liquid aqueous medium and sized so that only a portion of an adult human body can be placed therein; an ozone generator sized and adapted to produce sufficient ozone to effectively ozonate the liquid aqueous medium in the container; and a transfer assembly cooperating with the container and said ozone generator to pass ozone produced by the ozone generator to the liquid aqueous medium in the container.

20 Claims, 2 Drawing Sheets

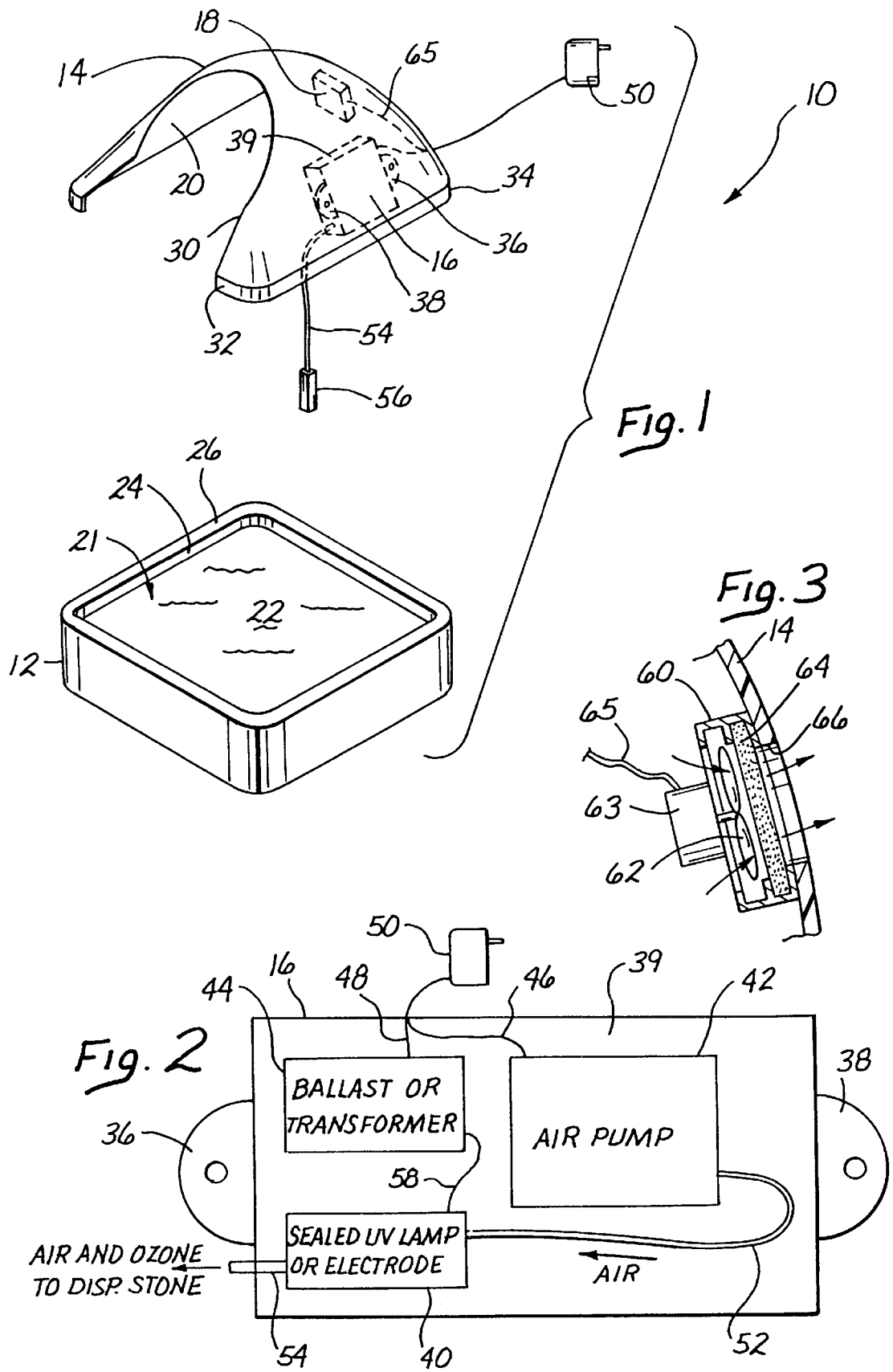

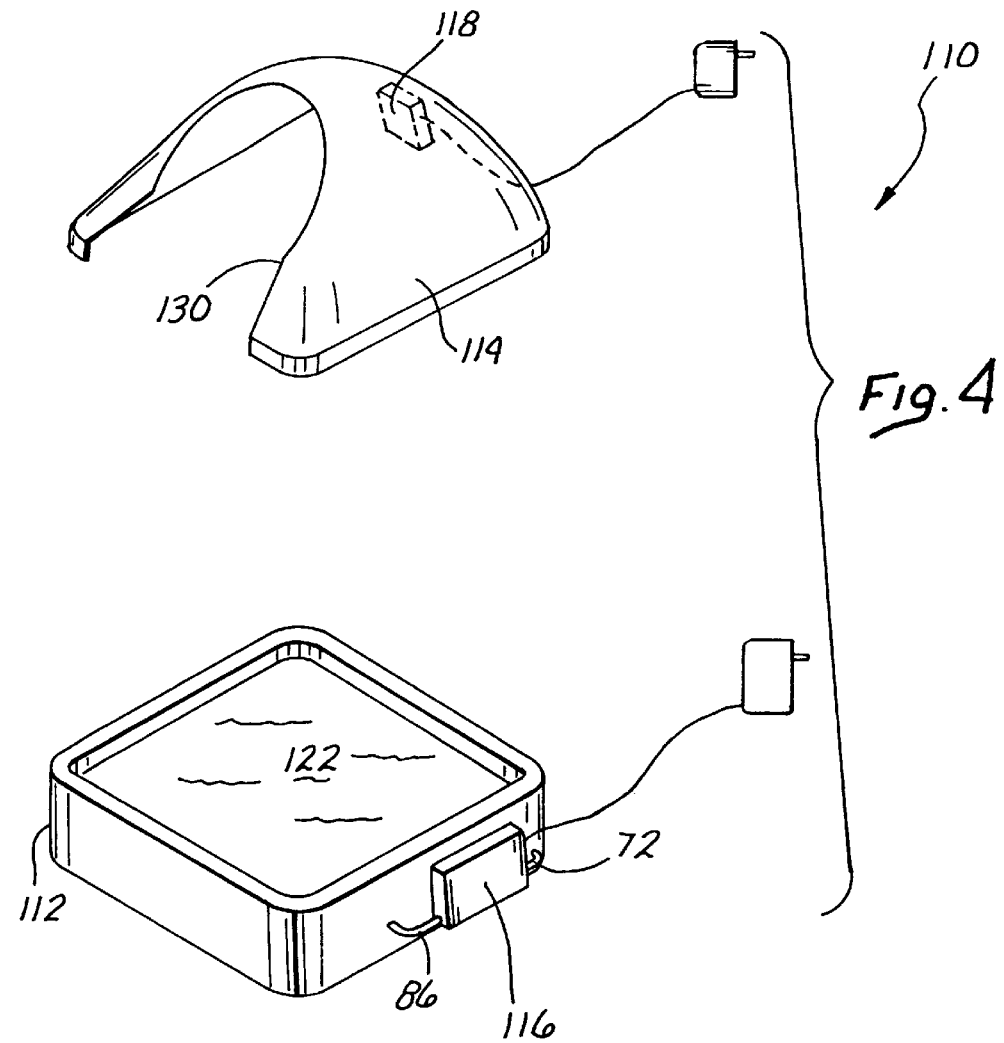
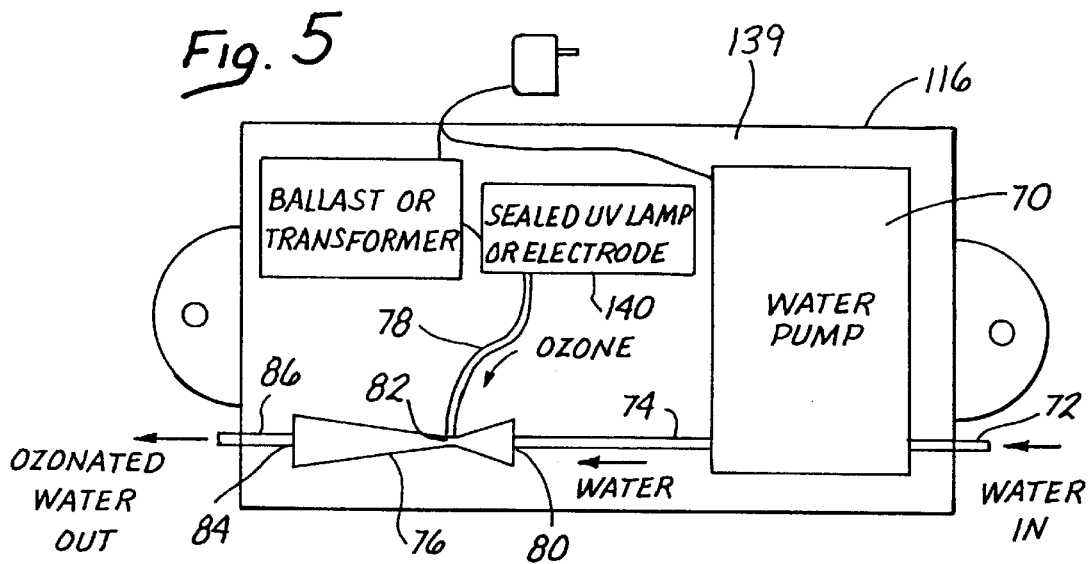

APPARATUS AND METHODS FOR TREATING FOOT FUNGI

BACKGROUND OF THE INVENTION

The present invention relates to systems for treating feet infected with fungi. More particularly, the invention relates to apparatus and methods specifically configured and adapted for the treatment of feet, such as human feet, infected with fungi, for example, athlete's foot fungus, which can be easily and effectively used to overcome such fungal infections.

Human feet are prone to fungal infections. For example, athlete's foot fungus is very prevalent and can easily and rapidly infect one's feet, even in spite of taking preventative steps. Once infected, it is often quite difficult to rid the feet of the fungus. Foot powders and other over-the-counter medications can be to some extent effective, but lose their efficacy over time, for example, because the active ingredients become inactivated by exposure to the environment.

Prescription medications and foot soaking treatments are used, particularly in more severe cases of foot fungal infections. However, such medications and treatments can have side effects and other disadvantages. For example, soaking an infected foot in potassium permanganate can discolor or stain the foot. These side effects and disadvantages have made the current medications and treatments difficult, or at least inconvenient, to use.

It would be advantageous to provide systems for treating feet infected with fungi which are effective and are easy and convenient to use.

Swimming pools, spas, hot tubs and the like are treated with active compounds to maintain the water therein in a sanitary or sanitized condition. Compounds, such as chlorine and ozone, have been used to sanitize the relatively large volumes, for example, hundreds or thousands of gallons, of water in such pools, spas, etc. As used herein, the term "spa" refers to a system which holds or contains a body of liquid aqueous medium, which is often heated, in a reservoir which is smaller than a swimming pool, but is sufficiently large so that an adult human being can be completely submerged or immersed in the liquid medium contained in the reservoir. Spas are often used by submerging all or a major portion of one's body in the liquid medium in the reservoir for recreation and/or relaxation. Additional, separate sanitizing components are also included in spa waters to control bacteria, algae, etc., which are known to contaminate such waters. Very low concentrations of these active materials are used in order to avoid harming sensitive parts of the body—since such pools, spas, etc. are sized so that the entire body can be immersed in the water and to minimize costs, because of the large volume of water to be treated. For example, the normal (that is the typical, non-acute contamination) concentration of ozone used to sanitize the water in a spa is often in the range of about 0.1 to about 0.2 parts per million (ppm) based on weight of ozone per volume of water (w/v).

Some owners of spas which use ozone in such sanitizing service have reported that their use of these spas to bathe their whole bodies have had a benefit on athlete's foot infections. It is not clear from these reports whether the sanitizing amounts of ozone alone result in this benefit or if other factors, for example, additional sanitizing components, are involved. Also, these reports do not suggest a specific therapy for fungal foot infections since the whole body is immersed in such spas and there was no control, or even monitoring, of the other activities or traits of the persons involved which could have played a role in achieving this benefit. In addition, a large number, even a large majority, of owners of swimming pools, spas, etc. which use ozone for sanitizing have not reported any benefit on athlete's foot infections.

SUMMARY OF THE INVENTION

Apparatus and methods for treating feet, such as human feet, infected with fungi, for example, athlete's foot fungus, have been discovered. It has been found that contact of the fungally infected foot with ozone in a liquid aqueous medium is effective to kill at least a portion of the infecting fungus. There is no need to immerse the entire body in the ozone-containing liquid medium and/or to use additional separate sanitizing components to obtain the benefit. In addition, because more sensitive parts of the body, for example, the eyes, nose, mouth, etc., are preferably not exposed to the ozone-containing liquid, a larger or greater concentration of ozone in the liquid, for example, dissolved in the liquid, can be employed, for example, greater than the concentration of ozone used to sanitize the liquid aqueous medium or water in a spa.

In short, systems for treating fungal foot infections are provided which are specifically adapted and configured for this purpose. The present invention provides for very cost and performance effective treatment of fungal foot infections, with few, if any, treatment side effects. For example, the present apparatus are easily and inexpensively manufactured and operated. The treatment effectively reduces or eliminates the fungal infection without staining or discoloring the foot. Moreover, the system can be used repeatedly with substantial anti-fungal efficacy and without substantial or undue detriment to the person being treated.

In one broad aspect of the present invention, apparatus for treating a foot infected with a fungus, for example, athlete's foot fungus, is provided. The apparatus comprise a container, an ozone generator and a transfer assembly. The container is adapted to hold a quantity of liquid aqueous medium, for example, in the range of about 0.5 or about 1 gallon to about 3 or about 5 or about 10 gallons, and is sized so that only a portion of an adult human body, preferably the feet of an adult human, can be placed in the container. The ozone generator, for example, of conventional and well known design, is sized and adapted to produce sufficient ozone to effectively ozonate the liquid aqueous medium, that is to provide an antifungally effective concentration of ozone to the liquid aqueous medium, in the container.

The concentration of ozone present in the liquid aqueous medium in the container is preferably greater than the concentration of ozone to effectively sanitize the water (liquid aqueous medium) in a spa. More preferably, the concentration of ozone present in the liquid aqueous medium in the container is at least about 10 times greater or at least about 50 times greater, and still more preferably at least about 100 times greater, than the concentration of ozone to effectively sanitize the water in a spa. For example, it is more preferred that the concentration of ozone in the liquid aqueous medium in the container is at least about 1 ppm or at least about 5 ppm, and still more preferably at least about 10 ppm, for example, about 20 ppm, (w/v).

The transfer assembly cooperates with the container and the ozone generator to pass ozone produced by the ozone generator to the liquid aqueous medium in the container.

In one embodiment, the transfer assembly includes a gas pump, a gas conduit and a dispersing element. This assembly is positioned and/or located so that the gas pump causes ozone-containing gas from the ozone generator to pass through the conduit to and through the dispersing element. The dispersing element, for example, a sparger or a porous member—such as a porous stone, is positioned or located in the container and is effective to disperse, and preferably to facilitate dissolving, the ozone-containing gas in the liquid aqueous medium in the container. As used in this paragraph, the term "in the container" with reference to the location of the dispersing element means the hollow space defined by the container which contains liquid aqueous medium when the apparatus is being used.

In another embodiment, the transfer assembly includes a liquid pump, a venturi or educter assembly and a transfer conduit adapted to provide a passage for ozone-containing gas between the ozone generator and the venturi assembly. The liquid pump is positioned or located so as to pump liquid aqueous medium from the container through the venturi assembly which has an inlet through which the liquid aqueous medium enters the venturi assembly and an outlet through which the liquid aqueous medium and a quantity of ozone exits the venturi assembly. The transfer conduit is positioned or located, relative to the venturi assembly, so that passage of liquid aqueous medium through the venturi assembly causes ozone-containing gas from the ozone generator to pass through the transfer conduit into the venturi assembly. The transfer conduit preferably terminates in the venturi assembly. The ozone-containing gas which flows from the transfer conduit into the venturi assembly preferably exits the venturi assembly with the liquid aqueous medium which exits the venturi assembly.

This embodiment preferably includes an inlet passage which provides fluid communication between the liquid pump and the inlet of the venturi assembly and an outlet passage which provide fluid communication between the outlet of the venturi assembly and the container. In a particularly useful embodiment, the inlet passage is sized and adapted to pass liquid aqueous medium from the liquid pump to the venturi assembly inlet. The outlet passage is preferably sized and adapted to pass liquid aqueous medium and a quantity of ozone from the outlet of the venturi assembly to the container.

A cover member is preferably included and is adapted to be secured to the container. The cover member may be integral with or separate from the container. The cover member is positioned or located relative to the container so that it at least partially covers the container, preferably so that it at least partially covers the liquid aqueous medium in the container. Such cover member is effective to reduce evaporation of the liquid aqueous medium and/or to reduce the uncontrolled escape of ozone-containing gas from the liquid aqueous medium in the container. The cover member preferably includes an opening sized to allow a human foot, preferably a pair of human feet, to be placed in the container through the opening while the cover member is secured to the container.

As noted above, particularly useful feature of the present invention involves using a concentration of ozone in the liquid aqueous medium which is greater than the concentration, for example, the minimum concentration, of ozone included in spa water to sanitize the spa water. Over a reasonable working range, the higher the concentration of ozone in the liquid aqueous medium in the container, the greater the beneficial effect on fungal foot infections. However, since ozone can be harmful to breathe in large concentrations and can be dangerous in a closed environment, it is advantageous to destroy ozone which escapes from the liquid aqueous medium in the container before it is breathed or passes into the environment. This is particularly true when relatively large concentrations of ozone are employed.

Preferably, the present apparatus further includes an ozone destruction assembly positioned or located relative to the container so as to destroy ozone which escapes from the liquid aqueous medium in the container. In a particularly useful embodiment, the ozone destruction assembly includes a fan and an ozone destroying element coupled thereto. The fan is positioned relative to the container so as to urge ozone-containing off gas (that is ozone-containing gas escaping the liquid aqueous medium) from the liquid aqueous medium in the container toward the ozone destroying element. In one useful configuration, the ozone destruction assembly is secured to the cover member, preferably to the inner surface of the cover member. Using this configuration, the escaped ozone is destroyed before it can be breathed or can pass into the general environment surrounding the apparatus.

Any suitable ozone destroying element may be used. Preferably, this element is effective to destroy sufficient ozone escaping the liquid aqueous medium in the container so that the general environment surrounding the present apparatus complies with applicable regulations and specifications, including—but not limited to, those promulgated by the U.S. Environmental Protection Agency. In one useful embodiment, the ozone destruction assembly destroys sufficient escaped ozone so that the average concentration of ozone in the general environment surrounding the apparatus is about 0.12 ppm (by volume) or less. More preferably, substantially all of this escaped ozone is destroyed by the ozone destruction assembly. A very useful ozone destroying element is carbon, for example, activated carbon preferably in a porous mass. Thus, the fan urges the escaped ozone to move toward and into contact with the ozone destroying element. Such contact is effective to destroy the ozone, for example, producing oxygen. Having a porous ozone destroying element is particularly effective since, after ozone destruction, the resulting gaseous products can be effectively vented to the general environment surrounding the apparatus.

In another broad aspect of the present invention, methods of treating a human foot infected with a fungus, such as athlete's foot fungus, are provided. In general, these methods comprise contacting a human foot infected with a fungus with a liquid aqueous medium, for example, in a container of an apparatus as disclosed herein. The liquid aqueous medium contains or includes an antifungally effective amount of ozone, and the contacting is conducted at conditions, for example, for a period of time, at a temperature and the like, effective to kill at least a portion of the fungus infecting the human foot. Preferably, ozone is the only or sole antifungal component present in the liquid aqueous medium. The use of liquid aqueous medium which includes ozone as the sole antifungal component distinguishes the presently useful liquid aqueous medium from water present in swimming pools, spas, hot tubs and the like which includes additional materials effective against bacteria, algae and the like which are known to inhabit or contaminate such waters.

The concentration of ozone included in the presently useful liquid aqueous medium is preferably greater, more preferably at least about 10 times or at least about 20 times, and still more preferably at least about 50 times or even at least about 100 times greater, in comparison to the concentration, e.g., the minimum concentration, of ozone included in spa water to sanitize or disinfect the spa water. To illustrate, the typical or normal dosage of ozone in spa water to obtain effective sanitization is on the order of about 0.1 to 0.2 ppm (w/v). In contrast, the preferred dosage of ozone in the liquid aqueous medium useful in the present invention is in the range of about 1 to about 10 or more ppm (w/v). The above-noted comparison is based on spa water which is suitable or recommended for normal casual or recreational use by humans, and is not based on emergency situations in which large dosages of santizing component are used to correct acute spa contaminations. In such emergency situations, spa use is prohibited until the acute contamination has been treated or alleviated.

In order to effectively treat the fungal infection, it is preferred that the contacting step be repeated at least once, more preferably repeated as often, for example, on a daily, semi-weekly or weekly basis, as is needed to eliminate the infection.

Because the ozone in the liquid aqueous medium is continuously lost, for example, by escaping from the liquid aqueous medium and/or by being consumed in performing its antifungal function, the present methods preferably include continuously generating ozone and/or supplying ozone (for example, the generated ozone) to the liquid aqueous medium during at least a portion of the contacting. The present methods preferably further comprise causing ozone escaping from the liquid aqueous medium to contact an ozone destruction element which is effective to destroy this ozone. This causing step more preferably occurs continuously during at least a portion of the contacting step.

These and other aspects and advantages of the present invention are apparent in the following detailed description and claims, particularly when considered in conjunction with the accompanying drawings in which like parts bear like reference numerals.

BRIEF DESCRIPTION OF THE DRAWINGS

FIG. 1 is a top front view, in perspective, of one embodiment of the apparatus in accordance with the present invention, with the cover separated from the container body for illustrative clarity.

FIG. 2 is a somewhat schematic illustration of the ozone generator and transfer assembly used in the apparatus of FIG. 1.

FIG. 3 is a partial view, partly in cross-section, of the second mounted member of the apparatus of FIG. 1.

FIG. 4 is a top front view, in perspective, of an alternate embodiment of the apparatus in accordance with the present invention, with the cover shown separated from the container body for illustrative clarity.

FIG. 5 is a somewhat schematic illustration of the ozone generator and transfer assembly used in the apparatus of FIG. 4.

DETAILED DESCRIPTION OF THE PREFERRED EMBODIMENTS

Referring now to the drawings, and in particular to FIGS. 1 to 3, a foot treatment apparatus, shown generally at 10, includes a container body 12, a top cover 14, a first mounted member 16 and a second mounted member 18. Both the first mounted member 16 and the second mounted member 18 are secured or mounted to the inner wall 20 of the cover 14. The container body 12, cover 14 and the housings of the first and second mounted members 16 and 18 (and in general all the components of apparatus 10) are made of any suitable materials of construction, preferably materials of construction which are at least to some extent resistant to the oxidative properties of ozone. Particularly useful materials of construction for the container body 12, cover 14 and housings of the first and second mounted members 16 and 18 are polymeric materials, for example, polyvinyl chloride (PVC), acrylonitrile-butadiene-styrene (ABS) polymers, polycarbonates and the like.

Although each of the components of the present systems are shown and/or described herein as individual units for illustrative and descriptive clarity, two or more components of apparatus 10 can be integrally formed, e.g., molded, for example, to produce a more compact and/or aesthetically pleasing unit. For example, the conduits, and/or other components can be formed at least partially in and/or concealed by the walls of the container body 12 and/or cover 14. Also, the container body 12 and cover 14 can be formed as a single piece. A great many different configurations are suitable for the present apparatus, such as apparatus 10. Each of these different configurations, for example, in which two or more components are integrally formed, are included within the scope of the present invention.

The container body 12 is configured to form a hollow space 21 in which a quantity of liquid aqueous medium 22 is provided. The container body 12 is sized and adapted so that a pair of adult human feet can be placed in the hollow space 21 defined by the container body so that the feet can be submerged or immersed in the liquid aqueous medium 22. The space 21 in which the liquid aqueous medium 22 is placed is partially defined by the inner wall 24 of the container body 12. The container body 12 is sized so that only a portion of the body of an adult human can be placed in the liquid aqueous medium 22 contained in the hollow space 21 defined by the container body. The container body 12 may have any suitable configuration. For example, the container body 12 may have a square or rectangular top/bottom configuration with each of the sides having a dimension in the range of about 10 inches to about 18 inches or about 20 inches, with about 14 inches being particularly useful.

The height of the liquid aqueous medium 22 in the container body 12 is in the range of about 2 inches to about 6 inches or about 8 inches. Container body 12 can effectively contain about 0.5 gallon to about 2.5 gallons, or about 1.5 gallons, of liquid aqueous medium 22. With the cover 14 placed or secured onto the top 26 of the container body 12, the height of the assembled apparatus 10 is in the range of about 8 inches to about 16 or about 18 inches, with a height of about 12 inches being particularly useful. Based on the dimensions described herein, it is clear that the present apparatus 10 is substantially smaller than a swimming pool, spa, hot tub and the like.

The cover 14 includes an opening 30 which extends from the first end 32 of the cover and terminates well before the opposing second end 34 of the cover. This opening 30 is sized and adapted so that a pair of human feet can be passed through the opening and into the liquid aqueous medium 22 in the container body 12 with the cover in place on the container body. In addition, the cover 14 is configured to cover the liquid aqueous medium 22 in the container body 12, at least to some extent, and, thereby, prevent ozone escaping from the liquid aqueous medium from passing into the general environment surrounding the apparatus 10.

First mounted member 16 is secured to the inner wall 20 of cover 14. Alternately, first mounted member 16 can be secured to the container body 12, and this alternate embodiment is included within the scope of the present invention. This securement can be accomplished in any suitable manner. For example, tabs 36 and 38 can be fastened, such as by being screwed or bolted, to the cover 14 or the entire first mounted member 16 can be adhesively secured or otherwise secured to the cover.

First mounted member 16 includes a first member housing 39, an ozone generator 40, an air pump 42 and a ballast or transformer 44. Both air pump 42 and ballast or transformer 44 are provided with electrical wires 46 and 48, respectively, which are joined to electrical plug 50 which can be coupled to a source of line voltage. All electrical connections, and the apparatus 10 in general, are designed and structured to meet or exceed all applicable industry and government regulations and specifications including, but not limited to, meeting or exceeding the applicable requirements of Underwriters Laboratory (UL).

Air pump 42 pumps air from the general environment surrounding apparatus 10 through gas conduit 52, through ozone generator 40 and into ozone conduit 54, and finally into and through porous stone 56. Air pump 52 can be of any conventional and well known design. The ozone generator 40 can be of any conventional and/or well known design. For example, the ozone generator 40 can include a sealed ultraviolet (UV) light lamp and/or an electrode, both of which are known to produce ozone in the desired amounts. A specific ozone generator 40 which is particularly useful in the present invention is an ozone generator sold by Del Industries under the trademark ZO-151. Another useful ozone generator is one that employs a relatively small size chip electrode in combination with a transformer to generate ozone from air using an electric discharge.

The porous dispersing stone 56 can be any suitable stone which is not affected by ozone and which does not affect ozone. The stone 56 should have sufficient porosity to disperse the ozone in ozone conduit 54 into the liquid aqueous medium 22 in container body 12. Thus, ozone conduit 54 should have sufficient length so that the porous dispersion stone 56 is completely submerged in the liquid aqueous medium 22 when cover 14 is secured to container body 12.

Ballast or transformer 44 is adapted to control the voltage in electric wire 58 which operates ozone generator 40.

Second mounted member 18 is secured, e.g., adhesively secured, to the inner surface 22 of cover 14. With reference to FIG. 3, second mounted member 18 includes second member housing 60, a fan 62 and a quantity of activated carbon 64. The fan 62, powered by conventional electric motor 63 (which receives power through electric wire 65) is sized and adapted to urge ozone-containing off gases which escape from the liquid aqueous medium 22 in container body 12 to move toward the activated carbon 64. The activated carbon 64 is positioned adjacent through hole 66 in cover 14. Thus, when the fan 62 is operating, the off gases from aqueous liquid medium 22 pass through and come in contact with the activated carbon 64 the gases resulting from this contacting are then exhausted through through hole 66 to the general environment surrounding apparatus 10. As the ozone escaping from liquid aqueous medium 22 contacts the activated carbon 64, the ozone is destroyed or otherwise rendered innocuous so that excessive amounts or concentrations of ozone are not admitted to the general atmosphere surrounding apparatus 10.

Apparatus 10 functions as follows. When it is desired to treat a pair of human feet infected with a fungus, for example, athlete's foot fungus, the apparatus 10 is prepared for use. Thus, a suitable quantity of water, for example, tap water, distilled water, deionized water or the like, is placed in the container body 12. This water should be at a temperature, for example, in the range of about 20° C. or about 25° C. to about 35° C. or about 40° C., so that the human being placing his or her feet in the water is comfortable. The cover 14 is then applied to the container 12 and the air pump 42 and ozone generator 40 are started and the fan 62 is also started.

The human being whose feet are infected with the fungus places his/her feet through opening 30 in cover 14 into the liquid aqueous medium 22. Ozone is continuously generated by ozone generator 40 and passed into the liquid aqueous medium 22 through the porous dispersion stone 56. Alternatively, a conventional timer, for example, in communication with electric wires 46 and 48, can be employed to control the time during which ozone is generated and passed to the liquid aqueous medium 22. Such a timer can be included to control the antifungal treatment and to provide a signal, after a predetermined period of time, indicating that the treatment is complete and/or should be concluded. The ozone which escapes the liquid aqueous medium 22 is continuously destroyed using the fan 62 and activated carbon 64, as described above.

After a period of time, for example, on the order of 0.1 hour to about 0.5 hours or 1 hour or 2 hours, preferably in the range of about 0.1 hour to about 0.5 hour, the air pump 42 and ozone generator 40 are stopped and the feet are removed from apparatus 10 and suitably dried off. After an additional period of time, for example, on the order of about 0.01 to about 0.2 hour, the fan 62 is stopped. At this point, the liquid aqueous medium 22 is removed from the container body 12. The apparatus 10 is now available for another antifungal treatment. A disposable container liner, for example, made of polymeric film, may be provided as a safety feature to assist in avoiding cross-patient contamination. Such a liner, for example, configured to fit on the bottom of hollow space 21 can be replaced and disposed of as often as desired, for example, after every treatment.

The above-described treatment is preferably repeated at least once, and more preferably a plurality of times, so that the fungal foot infection is substantially reduced in severity or eliminated.

FIGS. 4 and 5 illustrate an alternate embodiment of an apparatus in accordance with the present invention. Except as expressly discussed herein, the alternate apparatus of FIGS. 4 and 5 is substantially similar to, and functions substantially similarly to, the apparatus 10 shown in FIGS. 1, 2 and 3. Components of the apparatus shown in FIGS. 4 and 5 which correspond to apparatus 10 are denoted by the same reference numeral increased by 100.

The primary difference between apparatus 110 and apparatus 10 relates to the first mounted member 116. In particular, first mounted member 116 includes a water circulation system which is adapted to transfer ozone from the ozone generator 140 into the liquid aqueous medium 122 of container body 112.

Thus, first mounted element 116 includes a first member housing 139, a water pump 70 which pumps water from the liquid aqueous medium 122 through inlet conduit 72 through outlet conduit 74 and into educter 76. Ozone gas conduit 78 joins or provides fluid communication between ozone generator 140 and the educter 76. The passing of water from outlet conduit 74 into educter 76 through inlet 80 causes a vacuum to occur at or near the throat 82 of the educter. This vacuum is sufficient to pull ozone through ozone gas conduit 78 into the educter 76. The combined water and ozone is passed from outlet 84 of educter 76 through combined conduit 86 which passes this combination into the liquid aqueous medium 122 in container body 112. Combined conduit 86 can be equipped with a jet or nozzle-like device which can direct the ozone-containing combination to a specific region of the container body 112. A particularly infected part of the foot can be placed in the path of this stream of freshly ozonated liquid aqueous medium to provide an increased or enhanced antifungal effect.

The vacuum caused in educter 76 is sufficient to pull atmospheric air through ozone generator 140 so that the ozone generator produces ozone which then passes through ozone gas conduit 78 into the educter 76.

Apparatus 110 functions as follows. When it is desired to treat a pair of human feet infected with a fungus, for example, athlete's foot fungus, water, for example, tap water, distilled water, deionized water and the like, is placed in the container body 112. The cover 114 is then secured to the container body 112, and the water pump 70 and ozone generator 140 and fan in second mounted member 118 are turned on. The human feet are passed through the opening 130 and are submerged in the liquid aqueous medium 122 in container body 112.

After a sufficient treatment time, as expressed above, the human feet are removed from the liquid aqueous medium 122 and are suitably dried. The water pump 70 and ozone generator 140 are deactivated, and after a short additional period of time the fan in second mounted member 118 is deactivated. The liquid aqueous medium 122 is removed from the container body 112. At this point, the apparatus 110 is available for another antifungal treatment.

The present apparatus and methods are very effective for treating fungus infections on human feet. The amount of ozone included in the liquid aqueous medium is effectively controlled and the time of treating the human feet is also controlled so that the treatment achieves substantial antifungal effectiveness while, at the same time, minimizing or even eliminating any detrimental side effects of such treatment. It is important that not all of the human body is exposed to ozone and, in the preferred embodiment, that the ozone in the off gases from the liquid aqueous medium in the container are destroyed before being introduced into the general environment surrounding the apparatus. Thus, an effective treatment for foot fungal infection, such as athlete's foot fungus infection, is obtained in a safe and cost effective manner.

While this invention has been described with respect to various specific examples and embodiments, it is to be understood that the invention is not limited thereto and that it can be variously practiced within the scope of the following claims.

What is claimed is:

1. An apparatus for treating a foot infected with a fungus comprising:

a container adapted to hold a quantity of liquid aqueous medium and sized so that only a portion of an adult human body can be placed therein;

an ozone generator sized and adapted to produce sufficient ozone to effectively ozonate the liquid aqueous medium in said container; and a transfer assembly adapted to pass ozone produced by said ozone generator to the liquid aqueous medium in said container, said transfer assembly includes a gas pump, a gas conduit and a dispersing element and is positioned so that said gas pump causes ozone-containing gas from said ozone generator to pass through said gas conduit to and through said dispersing element which is located in said container and is effective to disperse the ozone-containing gas in liquid aqueous medium in said container.

2. The apparatus of claim 1 wherein said container is sized to allow feet of an adult human to be placed therein.

3. The apparatus of claim 1 which further comprises a cover member adapted to be secured to said container so as to at least partially cover said container, said ozone generator and said gas pump being secured to said cover member.

4. The apparatus of claim 1 which further comprises an ozone destruction assembly adapted and positioned to destroy ozone which escapes from liquid aqueous medium in said container.

5. The apparatus of claim 4 wherein said ozone destruction assembly includes a fan and an ozone destroying element coupled thereto, said fan being positioned relative to the container so as to move ozone-containing gas which escapes from liquid aqueous medium in said container toward said ozone destroying element.

6. The apparatus of claim 5 wherein said ozone destroying element includes carbon effective to destroy ozone which said carbon contacts.

7. The apparatus of claim 4 which further comprises a cover member adapted to be secured to said container so as to at least partially cover said container, said ozone destruction assembly being secured to said cover member.

8. The apparatus of claim 3 wherein said cover member includes an inner surface and said ozone generator and said gas pump are secured to said inner surface.

9. The apparatus of claim 3 wherein said cover member includes an inner surface and said ozone generator and said transfer assembly are secured to said inner surface.

10. An apparatus for treating a foot infected with a fungus comprising:

a container adapted to hold a quantity of liquid aqueous medium and sized so that only a portion of an adult human body can be placed therein;

an ozone generator sized and adapted to produce sufficient ozone to effectively ozonate the liquid aqueous medium in said container; and a transfer assembly adapted and positioned to pass ozone produced by said ozone generator to the liquid aqueous medium in said container, said transfer assembly includes a liquid pump, a venturi assembly having an inlet and an outlet and a transfer conduit adapted to provide a passage for ozone-containing gas between said ozone generator and said venturi assembly, said liquid pump being positioned to pump liquid aqueous medium from said container through said venturi assembly and said transfer conduit being positioned so that the passage of liquid aqueous medium through said venturi assembly causes ozone-containing gas from said ozone generator to pass through said transfer conduit into and through said venturi assembly.

11. The apparatus of claim 10 wherein said container is sized to allow feet of an adult human to be placed therein.

12. The apparatus of claim 10 which further comprises a cover member adapted to be secured to said container so as to at least partially cover said container.

13. The apparatus of claim 10 which further comprises an ozone destruction assembly adapted and positioned to destroy ozone which escapes from liquid aqueous medium in said container.

14. The apparatus of claim 13 wherein said ozone destruction assembly includes a fan and an ozone destroying element coupled thereto, said fan being positioned relative to the container so as to move ozone-containing gas which escapes from liquid aqueous medium in said container toward said ozone destroying element.

15. The apparatus of claim 14 wherein said ozone destroying element includes carbon effective to destroy ozone which said carbon contacts.

16. The apparatus of claim 13 which further comprises a cover member adapted to be secured to said container so as to at least partially cover said container, said ozone destruction assembly being secured to said cover member.

17. The apparatus of claim 10 wherein said ozone generator and said liquid pump are secured to said container.

18. The apparatus of claim 12 wherein said container includes an outer surface and said ozone generator and said liquid pump are secured to said outer surface.

19. The apparatus of claim 10 which further comprises an inlet passage which provides fluid communication between said liquid pump and said inlet and an outlet passage which provides fluid communication between said outlet and container.

20. The apparatus of claim 19 wherein said inlet passage is sized and adapted to pass liquid aqueous medium from said liquid pump to said inlet, and said outlet passage is sized and adapted to pass liquid aqueous medium and ozone from said outlet to said container.

* * * * *